Patented Mar. 30, 1943

2,315,259

UNITED STATES PATENT OFFICE 2,315,259

TREATING GLASS FIBERS

James Franklin Hyde, Corning, N. Y., assignor to Owens-Corning Fiberglas Corporation, a corporation of Delaware No Drawing. Application April 15, 1940, Serial No. 329,827

5 Claims. (Cl. 117—126)

This invention relates to glass fibers and treatments thereof and is a continuation in part of my pending application Serial Number 154,101, filed July 16, 1937, which was issued June 17, 1941, as Patent No. 2,245,783.

The object of the invention is to increase the electrical resistance and mechanical strength of glass fibers when they are subjected to humid conditions or are wet with water.

Glass fibers in general have a high electrical resistance and good flex strength when dry and fabrics made therefrom are particularly suitable for insulation coverings for cables and other electrical conductors. These properties depreciate more or less when the fibers are moist or wet with water. Such deterioration is particularly serious in the case of insulation which must be subject to wet or humid conditions such as the coverings for marine cables, etc. Flex strength is measured by drawing the fibrous yarn or fabric around a steel mandrel, one-eighth inch in diameter and free to rotate, the fibers being tensed by a weight of three-fourths of a pound. When dry, a glass fiber yarn will withstand this test for about 700 to 1000 flexes without breaking, but when wet, breakage occurs after only 30 to 40 flexes.

I have discovered that the electrical resistance and flex strength of glass fibers under wet or humid conditions is increased many fold by treating them with an aqueous solution of a metallic salt, preferably a chloride, fluoride, nitrate, acetate or sulfate salt.

I have further found that this effect is particularly marked in glasses which are substantially free from alkali metal oxides.

Other features of the invention will become apparent as the description proceeds.

In practicing the invention the fibers or textiles made therefrom are immersed in an aqueous solution of the desired salt which may be either cold or heated. If desired, an autoclave may be employed, but in this case some salts chemically attack the glass and should be avoided. A concentration of about 5% by weight is preferred, but concentrations up to 40% or more may be used for salts which are sufficiently soluble and which do not attack the glass under these conditions. In general an immersion time of one to eight hours is sufficient although longer times may be employed. After the treatment the material is washed thoroughly to remove the residual salts from its surface after which it is dried.

The following table shows the improvement in electrical surface resistance of glass insulating tape as measured in megohms per inch in high relative humidities for stated times after the above described treatment with various salt solutions. Glass A is an ordinary soda lime glass containing about 18% of alkali oxide and glass B is a magnesia lime glass containing about 17% of alumina and not more than 2% of alkali oxide.

| Glass | Salt solution | Conditions of test | | Megohms |
|---|---|---|---|---|
| | | RH | Time | |
| | | Percent | Days | Per inch |
| A | Untreated | 85 | 1 | 5 |
| A | 5% lead nitrate and lead oxide | 85 | 1 | 800 |
| A | 5% cupric nitrate and 1% cupric carbonate | 85 | 1 | 300 |
| A | 20% lead acetate and 20% copper acetate | 85 | 1 | 15,000 |
| A | 40% lead acetate | 85 | 1 | Infinite |
| A | 15% aluminum acetate and 2% aluminum oxide | 85 | 1 | 115 |
| A | 10% silver nitrate | 85 | 1 | 350 |
| A | 10% titanous chloride | 78 | 1 | 90 |
| A | Satd. titanic chloride | 78 | 1 | 13 |
| A | 5% barium nitrate and .1% barium carbonate | 78 | 1 | 280 |
| B | Untreated | 85 | 1 | 500 |
| B | ....do.... | 98 | 7 | 150 |
| B | 5% zinc chloride | 85 | 1 | 50,000 |
| B | 5% lead nitrate and lead oxide | 85 | 1 | 50,000 |
| B | 5% cupric nitrate and 1% cupric carbonate | 85 | 1 | 18,000 |
| B | 5% ammonium fluoride | 85 | 1 | 50,000 |
| B | 20% lead acetate and 20% cupric acetate | 85 | 1 | Infinite |
| B | 15% aluminum acetate and 2% aluminum oxide | 85 | 1 | 50,000 |
| B | 10% silver nitrate | 85 | 1 | 50,000 |
| B | 10% titanous chloride | 78 | 1 | 2,000 |
| B | Satd. titanic chloride | 78 | 1 | 3,000 |
| B | 5% barium nitrate and .1% barium carbonate | 78 | 1 | Infinite |
| B | 40% lead acetate | 85 | 1 | Infinite |
| B | 15% lithium acetate | 95 | 2 | Infinite |
| B | 15% barium acetate | 95 | 22 | 100,000 |
| B | 15% magnesium acetate | 95 | 22 | 12,000 |
| B | 15% ammonium acetate | 95 | 22 | 1,000 |
| B | 15% lead acetate and 8% lead oxide | 95 | 2 | Infinite |
| B | 15% cadmium acetate and cadmium hydroxide | 95 | ¼ | Infinite |
| B | 15% copper sulfate (ammoniacal) | 98 | 1 | 700 |

From the above table it will be noted that in general a treatment with any particular salt solution is more effective on the low alkali glass B than it is on the soda lime glass A. Moreover, solutions containing a lead salt are more effective with both glasses than solutions of other salts and lead acetate is particularly effective.

The following table shows the increase in flex strength of yarns composed of continuous fibers of a glass substantially free from alkali and containing about 23% of oxides of the second periodic group together with $Al_2O_3$ and $B_2O_3$ when treated with 5% aqueous salt solutions and tested wet by the above described method.

| Salt solution (5%) | Number of flexes before breakage |
|---|---|
| Strontium chloride | 75 |
| Barium nitrate | 166 |
| Barium chloride | 170 |
| Barium acetate | 170 |
| Cobalt nitrate | 140 |
| Cobalt chloride | 160 |
| Lead acetate | 420 |
| Zinc chloride | 370 |
| Aluminum chloride | 390 |
| Zinc acetate | 360 |
| Zinc sulfate | 160 |
| Lead chloride | 210 |
| Lead nitrate | 290 |
| Copper acetate | 80 |
| Manganese chloride | 112 |
| Calcium chloride | 98 |
| Calcium acetate | 60 |

Here again it will be noted that the lead salts are particularly effective and that the value for lead acetate exceeds all others.

What is claimed is:

1. The method of increasing the wet flex strength and electrical surface resistance under humid conditions of glass fibers which includes immersing the fibers for one to eight hours in an aqueous solution containing a metallic salt of an acid selected from the group consisting of acetic, hydrochloric, hydrofluoric, nitric and sulfuric acids and thereafter washing the fibers with water.

2. Method according to claim 1 in which the metallic salt is a lead salt.

3. Method according to claim 1 in which the glass contains less than 2% of alkali metal oxide.

4. The method of increasing the wet flex strength and electrical surface resistance under humid conditions of glass fibers which includes immersing the fibers from one to eight hours in an aqueous solution containing from 5% to 40% by weight of lead acetate, and thereafter washing the fibers with water.

5. The method of increasing the wet flex strength and electrical surface resistance under humid conditions of glass fibers which includes immersing the fibers from one to eight hours in an aqueous solution of a metallic acetate, and thereafter washing the fibers with water.

JAMES FRANKLIN HYDE.